June 26, 1934.  H. O. LOEBELL  1,964,293
MANUFACTURE OF CARBURETED WATER GAS
Original Filed July 17, 1925
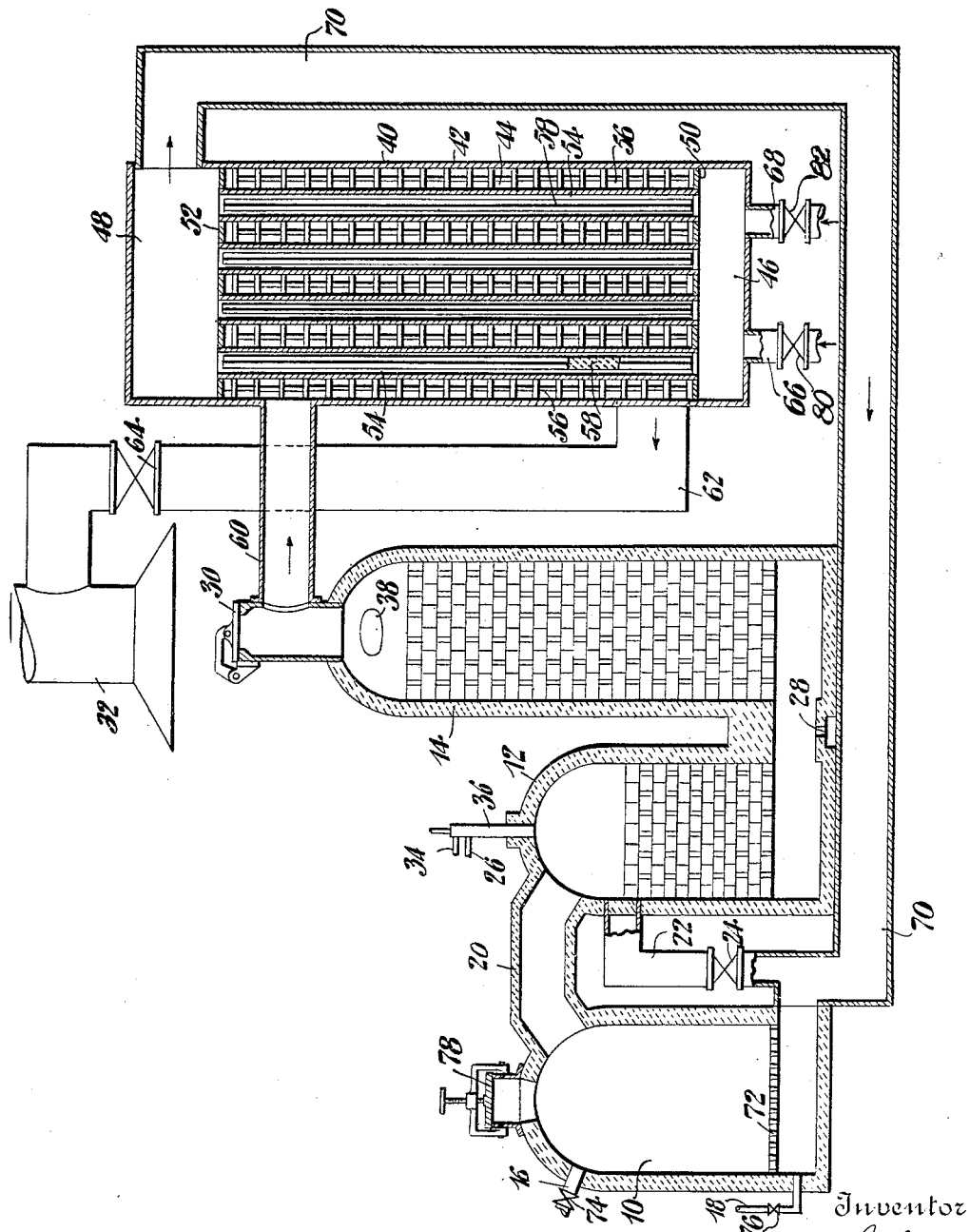
Inventor
Henry O. Loebell
By His Attorney
Edmund G. Borden Patented June 26, 1934

1,964,293

UNITED STATES PATENT OFFICE 1,964,293

MANUFACTURE OF CARBURETED WATER GAS

Henry O. Loebell, Malba Whitestone, Long Island, N. Y., assignor to Henry L. Doherty, New York, N. Y.

Continuation of abandoned application Serial No. 44,172, July 17, 1925. This application July 30, 1930, Serial No. 471,754

3 Claims. (Cl. 48—80)

The present invention relates to the manufacture of carbureted water gas and more particularly to an improved method of and apparatus for making carbureted water gas from anthracite coal, coke and bituminous coal.

The standard apparatus equipment commonly used for making carbureted water gas consists essentially of a gas generator connected in series with refractory lined carburetor and superheater elements. The cycle of operations is an intermittent one in which the temperature of a bed of fuel in the generator is periodically raised to incandescence by air blasting and between periods of air blasting water gas is produced by endothermic reactions between the incandescent carbon of the fuel and steam. The lean or blow gas produced in the generator during periods of air blasting is passed into the top of the carburetor element and burned with secondary air, and the products of combustion after imparting heat to the refractory fillings of the carburetor and superheater are exhausted to the atmosphere through the superheater stack, often while still at red heat. To make it suitable for household heating the calorific value of the water gas or blue gas produced during the gas making runs is raised by carburetion with hydrocarbons, preferably derived from mineral oils. To carry out this carburetion the blue water gas in passed into the top of the heated carburetor and oil is introduced into the gas stream as it enters the carburetor. The high degree of preheat imparted to the refractory linings of the carburetor and superheater during the air blow cycle serves to vaporize the oil and to crack the vapors down to fixed gaseous hydrocarbons. These hydrocarbons are swept along with the stream of water gas through the carburetor and superheater and on into the purification apparatus and they serve as enriching agents for materially increasing the calorific value of the final gaseous product.

In general the manufacture of carbureted water gas in a standard set of apparatus such as that above referred to is characterized by a relatively low thermal efficiency and a poor heat balance. Such heat as is recovered by burning the air blow gases is used in supporting the vaporization and fixation of hydrocarbon oils for carbureting the water gas and there is no provision for recovering the great amount of additional heat carried out of the generator by the blast gases nor for returning any heat to the generator, as in the form of preheated fuel, blast air or steam. In operation with the standard set a large portion of the heat developed in the generator is wasted by radiation to the atmosphere, by removal in the form of sensible heat in the exhaust blast gases leaving the superheater stack during the blow, and by removal as latent heat of vaporization in the large volumes of excess moisture carried out of the apparatus by the generated gases.

The primary object of the present invention is to provide for the economical and effective recovery of a substantial portion of this waste heat and for the return of the heat recovered to the gas making zone of the generator in usable form.

Another object of the invention is to provide an improved method and apparatus by which the manufacture of carbureted water gas from anthracite coal, coke and bituminous coal can be conducted on a substantially balanced thermal plan or cycle.

Another object of the invention is to provide a method and apparatus by means of which the cost of manufacture of carbureted water gas can be materially reduced and the thermal efficiency of operation can be materially increased over present commercial practice.

In accordance with these objects one feature of the present invention contemplates recovering a substantial part of the potential heat remaining in the waste air blow gases at the time they normally exit from the top of the superheater element and returning this heat to the generator.

Another feature of the invention contemplates improvements in the process and relatively simple additions to the standard set of apparatus by means of which this additional heat can be recovered from the blow gases and utilized to preheat air for the blow and to superheat steam for the run, thereby leading to operation on a substantially balanced thermal cycle.

With these and other objects and features in view, the invention consists of the improved method of and apparatus for making carbureted water gas hereinafter described and particularly defined in the claims.

The various features of the invention are illustrated in the accompanying drawing, in which:

The view is a front vertical section, with parts in elevation, showing a standard water gas set comprising generator, carbureter and superheater together with the regenerative recuperator and auxiliary connections embodying the preferred form of the present invention.

The apparatus equipment illustrated in the drawing consists of any standard water generator set including a water gas generator 10, a carburetor 12, and a superheater 14, all connected in series and provided with the auxiliary connections and equipment incident to their functional cooperation. Included in this auxiliary equipment are blast air and steam inlet pipes 16 and 18, located respectively at the top and near the base of the generator 10; an open conduit 20 leading from the top of the generator into the top of the carburetor and a conduit 22 containing a valve 24 leading from the base of the generator into the upper portion of the carburetor; a secondary air connection 26 at the top of the carburetor and another secondary air port 28 at the base of the superheater; a stack valve 30 and a stack 32 at the top of the superheater; an oil supply line 34 and an injector nozzle 36 at the top of the carburetor 12; and a rich gas offtake 38 leading from the top of the superheater preferably to condensing and scrubbing equipment (not shown).

Added to this standard equipment is a regenerative recuperator 40 of the general type and arrangement particularly illustrated and described in my co-pending application, Ser. No. 4880 filed January 26, 1925 now Patent 1,867,163. Essentially this recuperator comprises an outer metal or refractory casing 42, here shown as cylindrical in form, having a heating chamber 44 taking up a large proportion of its mid-section, such heating chamber being sealed off from an open distributing chamber 46 in the base of the casing and from an open collecting chamber 48 at the top of the casing by header sheets 50 and 52, respectively. A number of flues or sections 54, preferably constructed of high temperature metal with a rectangular, circular or odd-shaped cross-section, have their ends tightly fitted in openings in headers 50 and 52 and thereby serve as passageways for conducting gas from distributing chamber 46 through and out of contact with hot gases passing through heating chamber 44 and into collecting chamber 48 at the top of the recuperator. The heating chamber 44 is filled with bulky refractory 56 of fireclay, carborundum or other suitable heat refractory material positioned according to and for the purposes described in my co-pending application; and likewise the flues 54 are preferably equipped with refractory cores 58 of the general type and for the purposes outlined in the above mentioned application. The heating chamber 44 of the regenerative recuperator 40 and the standard superheater element 14 are interconnected by means of an open conduit 60, and the heating chamber 44 is likewise equipped with a waste gas offtake 62 connecting it with stack 32 through a valve 64. A cold air inlet 66 and a steam inlet 68 open into distributing chamber 46 at the base of the recuperator, and an open conduit 70 connects collecting chamber 48 at the top of the recuperator with the base of the gas generator 10 below grate bars 72. In operation with the present apparatus the primary air and steam inlets 16 and 18 to the generator are permanently closed and blanked off as by valves 74 and 76 respectively, the conduit 22 leading from the base of the generator to the top of the carburetor is permanently closed by bricking up the inlet into the carburetor and also by closing valve 24, and stack valve 30 at the top of superheater 14 also remains permanently closed.

The improved method of making carbureted water gas constituting the preferred form of the present invention is carried out in the arrangement of apparatus shown in the drawing substantially as follows:

Fuel such as coke, anthracite or bituminous coal is periodically charged through charging gate 78 onto the top of a bed of fuel supported in the generator by grate bars 72. The bed of fuel in the generator is maintained at gas making temperatures by periodically blasting the fuel with air which is introduced into the apparatus through inlet 66 at the base of the recuperator, and after passing through the metal recuperator sections 54 into the collecting chamber 48 is conducted through conduit 70 into the base of the generator and enters the bottom of the fuel bed through grate 72. The blow gases produced during this blast cycle pass through conduit 20 into the top of the carburetor 12 and are burned by secondary air introduced through a connection 26 and injector 36. Additional secondary air for completing combustion of the blow gases may be admitted into the base of the superheater element 14 through port 28. In passing downwardly through the refractory lining in carburetor 12 and upwardly through the refractory in superheater 14 the hot products of combustion impart preheat to the refractory by direct heat transfer, and from the top of the superheater they are passed through conduit 60 into the heating chamber 44 of recuperator 40, wherein they give up most of their remaining sensible heat to the refractory 56 and to the outer metal surfaces of conduits 54 by direct heat transfer. The relatively cool products of combustion or waste blast gases are exhausted from the heating chamber of the recuperator through pipe 62 into the stack 32 by means of valve 64.

After the temperature of the bed of fuel in the generator has been raised sufficiently to support water gas reactions, the flow of air into the apparatus through inlet 66 is cut off by closing valve 80, the admission of secondary air into the carburetor and superheater through pipe 26 and port 28 is suspended, and valve 64 in the exhaust pipe 62 is closed. The air blast cycle is then followed by a water gas making run in which saturated steam is admitted into the apparatus through an inlet 68 in the base of the recuperator 40 by opening a valve 82, and this steam, after adsorbing superheat during its passage through the metal sections 54 at the expense of heat regenerated and stored in the refractory 56 surrounding the conduits and in the walls of the conduits and the refractory cores 58, is passed from collecting chamber 48 through conduits 70 into the base of the generator and enters the hot fuel bed through grate bars 72. The blue water gas produced by reaction of the superheated steam with the incandescent carbon of the fuel is passed through conduit 20 into the top of carburetor 12 where it meets a spray of oil introduced through pipe 34 and injector 36. The current of water gas carries the oil downwardly through the hot checker brick linings of the carburetor and upwardly through the linings of the superheater, and the oil is rapidly vaporized and broken down into fixed gaseous hydrocarbons by absorption of some of the preheat imparted to the refractory during the previous air blast cycle. From the top of the superheater the carbureted water gas is passed through the offtake 38, preferably into condensing and scrubbing apparatus and to storage tanks or distributing means (not shown).

From the above description it will be seen that the chief operating features which distinguish the present method of making carbureted water gas from that normally employed in standard equipment are: first, the use of preheated primary air introduced at the base of the generator and passed upwardly through the fuel bed,—in place of cold primary air which in common practice may be introduced into the generator either through an inlet 18 below the grate bars or through inlet 16 above the fuel bed, being passed respectively upwardly and downwardly through the bed of fuel in the generator; secondly, the use of superheated steam introduced at the base of the generator and passed upwardly through the fuel bed during the water gas making run,—as distinguished from normal practice in which saturated steam is admitted through the inlets 16 and 18 and the gas making run is ordinarily varied by alternate up and down runs; thirdly the recovery of a substantial portion of the sensible heat of the air blow gases,— which in operation with the standard equipment normally passes out through stack valve 30 and is lost,—by means of a regenerative recuperator 40 wherein a part of the heat of the blow gases is transferred immediately to the primary air through the walls of the metal sections 54, and another portion of the heat of the air blow gases is regenerated in the refractory 56 and in the refractory cores 58 and is subsequently utilized to impart superheat to the steam used during the gas making run. A fourth feature of the invention is that the apparatus is so arranged that hot valves in the path of the air blow gases and of the water gas are entirely eliminated and by the use of the one additional apparatus unit, namely the recuperator 40, it is possible to recover a major portion of the heat carried out of the generator and to continuously return this heat in the form of preheated blast air and superheated make steam, in spite of the fact that the normal intermittent method of water gas manufacture is still employed.

As indicated in my aforementioned co-pending application, the primary purpose of the refractory checker brick 56 surrounding the metal sections 54 of the recuperator and of the refractory cores 58 on the inside of the recuperator sections is to increase the rate at which heat is normally transferred from the gaseous heating medium by convection to the outer surface of the metal sections, then by conduction through the metal, then by convection to the gaseous medium taking up heat, by the supplemental transfer of additional heat from the heating gas to the gas taking up heat indirectly by convection to the surface of refractory 56, thence by radiation to the outer surface of the metal, thence by conduction through the metal, thence by radiation to the surface of the refractory cores 58 and by convection to the gas taking up heat over the enlarged heating surface thus exposed. The refractory filling 56 is preferably arranged in such a way as to present a maximum surface facing and spaced from the outer surface of sections 54 in order to permit the heating gases to circulate between the surface of the refractory and the metal surface and in order to expose a maximum heat absorbing surface to the hot gas and a maximum heat radiating surface facing the outer surface of the metal. In like manner, the refractory cores 58 which are placed on the inside of conduits 54 in the path of the air and steam taking up heat are preferably designed with corrugations on their outer surface in order to present a large surface for the absorption of heat radiation from the inner walls of the metal sections and also to present a heating surface to the cool gas passing through the sections which substantially doubles the area of metal heating surface normally exposed to the gas.

Likewise as indicated in my aforementioned co-pending application it is of advantage in an intermittent operation such as is involved in water gas manufacture to have the refractory filling surrounding the metal sections of the recuperator and the refractory cores on the inside of the metal sections as bulky as is allowable without offering an undue amount of resistance to the flow of heating gas through the heating chamber of the recuperator and to the passage of air and steam through the conduits 54, in order to utilize the known capacity of the refractory to store heat for regenerating heat from the exhaust blast gases in excess of that immediately transferred to the blast air, in sufficient amounts to maintain a continuous supply of heat to the steam which is passed through the conduits during the water gas making run, i. e. during the periods in which the flow of air blow gases through the heating chamber 44 is discontinued.

One of the chief advantages of the apparatus embodying the preferred form of the invention is that it is based on the use of standard water gas equipment. Likewise the general cycle of operations resembles that commonly employed in water gas manufacture with standard equipment insofar as is consistent with thermally efficient operation and a balanced thermal cycle. By the simple addition of one apparatus unit, namely a regenerative recuperator, with its auxiliary connections, to the standard water gas equipment it is possible with the present apparatus to carry on preheating of the blast air and regeneration of the heat of the blast gases simultaneously. Likewise with this apparatus arrangement it is possible to superheat the steam used and at the same time to carry on the carburetion of the water gas with hydrocarbon oils; and as previously indicated all these operations can be conducted without the use of a single hot valve or other obstruction in the path of the hot gases at any point in the apparatus.

By regulating the amount of secondary air admitted into the top of the carburetor through pipe 26, any proportionate part of the air blow gases can be burned in the carburetor, and such part as is not burned in the carburetor can be burned in the superheater and in the heating chamber 44 of the recuperator by secondary air admitted through port 28. The degree to which the blow gases are burned in carburetor 12 is preferably controlled so that only sufficient heat will be regenerated in the refractory filling of the carburetor to complete the vaporization of the carbureting oils and the partial fixation of their vapors into gaseous hydrocarbons. By thus limiting the amount of heat stored in the filling of the carburetor, additional heat can be imparted to the refractory filling of the superheater and to the refractory filling and metal sections of the recuperator 40 for the purpose of completing the fixation of the carbureting oil vapors in the superheater during the water gas making runs, and for supplying additional heat to the air-preheating and steam superheating operations which are carried on in recuperator 40.

The heating capacity of the recuperator 40, the heat storage capacity of the refractory checker brick 56 and cores 58, the volumes of secondary air admitted through inlets 26 and port 28, and the rate at which blast air, steam and products of combustion are passed through the different sections of the recuperator are all preferably under control for the purpose of preheating the blast air and the steam to a temperature of about 700° F. This is about the maximum temperature that the grate bars 72 of the generator will permit.

Due to a better balanced thermal cycle the present method of generating carbureted water gas will require less primary blast air and less secondary air per unit of production than is required in normal practice, and accordingly the capacity of the generator per unit of cross section will be materially higher and the loss of potential heat with the air blast gases will be almost negligible as compared to that commonly occurring in commercial practice. Likewise on account of the increased capacity of the generator the percentage loss of heat by radiation to the atmosphere will be materially reduced. Also by superheating the steam it is possible to generate a large volume of water gas per volume of make steam employed and thereby to further increase the gas making capacity of the generator and at the same time to materially reduce the volume of excess moisture carried out of the apparatus by the water gas, thus materially reducing the loss of heat in the form of latent heat of vaporization in the moisture which is present in most water gas produced heretofore in commercial practice. All of these various features, together with the fact that it is possible with the present apparatus to give the steam a longer time contact with the incandescent carbon of the fuel bed and to increase the volume and lower the velocity of steam input without increasing the moisture content of the water gas, results in an increased thermal efficiency for the entire operation which has been estimated to be over twenty percent above that obtained in commercial practice.

It is not intended by the above description to limit the scope of the invention to the use of any particular design or type of recuperator other than one having refractory fillings or cores or both refractory fillings and cores. It is preferred to use a recuperator having metal flues or diaphragms because in general metal is a superior heat conductor and is physically much stronger, much less bulky and much less subject to gas leakage under superatmospheric pressures and under pressure differentials than are sections of like capacity built of refractory or similar material.

By the term "refractory" as used in the specification and claims it is intended to define generically a material having a large capacity for storing up heating and for absorbing and transmitting heat in the form of radiant energy.

The term "regenerative recuperator" whenever used in the specification and claims is intended as a generic term to define apparatus such as that described, having bulky refractory surrounding or filling or both surrounding and filling the heating flues and adapted for heat regenerative in addition to recuperative service.

This case is a continuation of applicant's co-pending patent application Serial No. 44,172 filed July 17th, 1925 for Manufacture of carbureted water gas.

The invention having been thus described, what is claimed as new is:

1. Apparatus for making carbureted water gas comprising the addition to a plant including individual water gas generator, carburetor and superheater connected in series, with secondary air inlets whereby blow gases produced in the generator may be burned in the carburetor and superheater, of a recuperator having a gas cooling chamber in permanent open communication with the top of the superheater and having a gas heating section in permanent unobstructed communication with the base of the generator, means for passing primary air through the said heating section of the recuperator and thence into the generator, separate means for passing steam through the said heating section of the recuperator into the generator, and valved means for leading off burning blow gases from the said gas cooling chamber of the recuperator into a stack.

2. Apparatus for manufacture of carbureted water gas, comprising the addition to a plant including a set of single water gas generator, carburetor and superheater connected in series in constant and uniform relation with a permanently free passage for gas therethrough, and with respective secondary air ports in the carburetor and superheater for burning blow gases therein, of a recuperator comprising a housing, a gas cooling chamber in said housing, gas heating flues extending through said cooling chamber, an open valveless conduit connecting said gas cooling chamber with the superheater, means for conducting gas produced in the generator through said conduit and cooling chamber before exhausting to the atmosphere, separate valve controlled inlets for introducing air and steam into the gas heating flues of the recuperator at an end thereof, and an open valveless conduit connecting the other end of the flues with the generator, for leading air and steam passed through said heating flues into the generator.

3. Apparatus for making carbureted water gas, comprising a standard water gas set including a water gas generator, a carburetor, and a superheater connected in series, a rich gas offtake leading off from the superheater, a unitary recuperator having heat-transferring diaphragms separating it into a gas cooling chamber and gas heating passages, valved means for introducing cold air into the gas heating passages, a valve-free unobstructed conduit directly connecting the gas heating passages with the lower part of the generator for conveying highly heated blast air to the latter, a valveless unobstructed conduit directly connecting the superheater with the gas cooling chamber of the recuperator, and a valved waste gas conduit connecting the gas cooling chamber with a waste gas stack.

HENRY O. LOEBELL.